United States Patent [19]

Harper et al.

[11] 3,846,395

[45] Nov. 5, 1974

[54] PLASTICS COMPOSITIONS

[75] Inventors: David John Harper; John Forgie McKellar, both of Blackley, England

[73] Assignee: Imperial Chemical Industries Limited, London, England

[22] Filed: Oct. 26, 1971

[21] Appl. No.: 192,661

[30] Foreign Application Priority Data
Nov. 2, 1970 Great Britain.................... 51920/70

[52] U.S. Cl. 260/94.9 GC, 260/DIG. 43, 260/94.76 C
[51] Int. Cl. ............................................ C08f 27/28
[58] Field of Search . 260/DIG. 43, 94.9 GC, 45.7 R

[56] References Cited
UNITED STATES PATENTS

| | | | |
|---|---|---|---|
| 2,484,529 | 10/1949 | Roedel............................. | 260/45.7 |
| 3,001,970 | 9/1961 | Ebel et al...................... | 260/45.7 R |
| 3,014,799 | 12/1961 | Oster........................... | 260/DIG. 43 |
| 3,300,462 | 1/1967 | Guzzetta et al............... | 260/DIG.43 |
| 3,423,484 | 1/1969 | Allison.......................... | 260/45.7 R |
| 3,444,155 | 5/1969 | Fish............................. | 260/94.9 GC |
| 3,454,510 | 7/1969 | Newland et al............. | 260/94.9 GC |
| 3,493,536 | 2/1970 | Weisfeld....................... | 260/45.7 R |
| 3,642,690 | 2/1972 | Mills............................ | 260/45.7 R |

*Primary Examiner*—Hosea E. Taylor
*Attorney, Agent, or Firm*—Cushman, Darby & Cushman

[57] ABSTRACT

Thermoplastics compositions contain ketones, thioketones, oximines, imines or hydrazones as prodegradants. The preferred additives are p-laurylacetophenone and p-laurylbenzophenone.

6 Claims, No Drawings

PLASTICS COMPOSITIONS

This invention relates to plastics compositions and in particular to polyolefine compositions.

The use of disposable plastics wrappings, containers and the like and their subsequent discarding, either intentionally or accidentally, has led to the problem of plastics litter. This invention relates to a plastics composition the use of which can alleviate the problem.

According to the invention a thermoplastics polymer composition contains a prodegradant 0.001 percent up to 10 percent by weight of either a ketone or a ketone derivative, said keytone having the general formula $$R^1-(CO)_n-R^2$$

where $R^1$ is an aromatic group, preferably a phenyl group or an alkylphenyl group;
$R^2$ is a substituted phenyl group, e.g. an alkylphenyl group or a saturated aliphatic group, e.g. an alkyl group, or
$R^1$ and $R^2$ are both aromatic groups which are joined together either directly or via a chain of one or more carbon atoms, and $$n = 1 \text{ or } 2;$$

said ketone derivative having the formula:-

$$R^3-\overset{X}{\underset{\|}{C}}-R^4$$

where $R^3$ is a phenyl group or a substituted phenyl group,
$R^4$ is an aromatic or aliphatic group, and
X is a sulphur atom, an oximino group, an imino group, a hydrazone group or a substituted derivative of one of these groups.

The preferred ketones are those in which $n = 1$, $R^1$ is phenyl and $R^2$ is a p-alkylphenyl or those in which $n = 1$, $R^1$ is p-alkylphenyl and $R^2$ is alkyl. Examples of these are p-laurylbenzophenone and p-laurylacetophenone.

Examples of the substituted ketone derivatives, i.e., values for X, are butoximino, acetyloximino, lauryloximino groups; methyl-, ethyl-, propyl-, butyl-, cyclohexyl-, octyl-, dodecyl-, octadecyl-, phenyl- and substituted phenyl- amino groups; and phenylhydrazone, methylphenylhydrazone, methylhydrazone and octylhydrazone groups.

The compositions according to the invention are preferably polyolefine compositions, e.g. compositions in which the thermoplastics polymer is a polymer of ethylene, propylene, butene-1, and 4-methyl pentene-1 and copolymers of these monomers either with each other or with other α-olefines. The ethylene polymers may be either the high density or the low density type.

In addition to the polymer and the prodegradant a composition according to the invention may also include other additives which are conventionally incorporated in thermoplastics polymer compositions, for example in the case of polyolefines they may incorporate anti-blocking agents, slip agents, anti-static agents, stabilisers to stabilise the composition during processing as well as stabilisers to stabilise the composition during use (i.e., after processing has finished).

The invention includes disposable wrappings (e.g. wrapping film) and disposable containers made of the plastics composition described above. The following are examples of containers; bags, sacks, boxes, cartons, bottles, sachets, cups and cartridge cases.

The invention also includes an item of merchandise packed in a material made of a plastics composition as described above.

Several compositions according to the invention will now be described by way of example.

EXAMPLES 1 – 14

Various prodegradants, as set out in Table 1, were incorporated into polypropylene to give final concentrations of 0.06 and 0.006 moles/kg of the final composition (about 1 percent weight for most of the prodegradants). Two sets of samples were prepared; in one set the prodegradants were added to unstabilised polypropylene in the other to polypropylene containing:

0.04 percent weight of 1,1,1-tetrakis (3',5'-di-t. butyl-4'-hydroxy phenyl) propionyl oxymethylmethane 0.17 percent weight distearyl thiodipropionate 0.2 percent weight calcium stearate These mixtures were pressed to a film of thickness 100 microns using a compression moulding cycle comprising: heat at 488°K for 180 seconds at a pressure of 154.4 kN/m², pressed for 240 seconds at 488°K and a pressure of 3.089 MN/m² and, maintaining the same pressure, cool to 298°K over a period of about 600 seconds.

Samples 1 cm by 3 cm were cut from the pressed film and subjected to UV irradiation in a Xenotest accelerated ageing machine. The samples were inspected daily and tested for flex-crack failure. The time to failure is taken as a measure of the performance of the additive. The unstabilised polypropylene samples were also tested by outdoor exposure to sunlight. These tests were carried out at Welwyn Garden City, Hertfordshire, England and they began on Dec. 11, 1970. The procedure was as follows.

Speciments of foil 0.1 mm thick were mounted between 'Perspex' (RTM) sheets with a circle 2 cm in diameter uncovered and these were exposed at 45° to the horizontal facing south. The specimens were tested for embrittlement at weekly intervals by dropping a 3.8 g mass in the form of a 7.5 mm diameter rod onto the horizontal specimen. The mass was dropped from a height of 310 mm down a vertical guide tube. Repeats with the same formulations gave identical embrittlement times.

The results of all these tests are given in Table 1.

TABLE 1

| | Prodegradant | Xenotest. Days to embrittle at additive conc.(mole/kg) Example | | | | Open Air Test Weeks 0.06 mole/kg Prodegradant |
|---|---|---|---|---|---|---|
| | | Unstabilized | | Stabilized | | |
| | | 0.06 | 0.006 | 0.06 | 0.006 | |
| 1 | 9-Fluorenone | 3 | 4 | 4 | | 7 |
| 2 | Benzil | 2 | 4 | 2 | | 6 |
| 3 | 4,4'-bis(N-dimethylamino) benzophenone | 3 | — | 3 | | 6 |

TABLE 1—Continued

| | Prodegradant | Xenotest. Days to embrittle at additive conc.(mole/kg) Example | | | | Open Air Test Weeks 0.06 mole/kg Prodegradant |
|---|---|---|---|---|---|---|
| | | Unstabilized | | Stabilized | | |
| | | 0.06 | 0.006 | 0.06 | 0.006 | |
| 4 | 4-chlorobenzophenone | <1 | — | <1 | 2 | 6 |
| 5 | 2-chlorobenzophenone | <1 | — | — | 2 | 6 |
| 6 | 3-bromobenzophenone | <1 | — | — | 2 | 6 |
| 7 | 4-bromobenzophenone | <1 | 2 | — | 2 | 7 |
| 8 | 4-nitrobenzophenone | <1 | 4 | — | 2 | 11 |
| 9 | 4-methylbenzophenone | <1 | — | — | 2 | 6 |
| 10 | 4-methoxybenzophenone | <1 | 3 | — | 2 | 6 |
| 11 | 2,4-dichlorobenzophenone | <1 | 2 | <1 | — | 6 |
| 12 | 4,4'-dichlorobenzophenone | <1 | 2 | — | 2 | 6 |
| 13 | Anthrone | <1 | 2 | <1 | — | 6 |
| 14 | 1,2-benz-10-ketoanthracene | 3 | — | — | — | 6 |

Blanks were also carried out to compare with results given in Table 1. The results on the blanks were:

| Xenotest (Stabilised) | 5 days |
| Xenostest (Unstabilised) | 4 days |
| Outdoor Test | 13 weeks |

Thus Table 1 shows that all the prodegradants reduced the time to embrittle in the Xenotest; in most cases there was a substantial reduction. In the outdoor test sample 8 produced a small reduction, the other samples cut the time to about half.

EXAMPLES 15 – 17

The prodegradants whose formulae are given in Table 2 were blended at 0.1 percent weight with low density polyethylene. Tensile specimens, 1.5 mm thick and cut parallel to the direction of extrusion, were tested by 3 months exposure to sunlight in Florida during which time they received 40,000 Langleys of radiation. The elongation to break was measured (on duplicate samples) before and after exposure. The percentage retention of elongation is given in Table 2.

TABLE 2

| Example | Prodegradant | % Retention |
|---|---|---|
| 15 | $CH_3COC_6H_4C_{12}H_{25}$* | 35 |
| 16 | $C_6H_5COC_6H_4OH$* | 47 |
| 17 | $C_6H_5COC_6H_4CL$* | 42 |

*The $C_6H_4$ was para linked.

Without a prodegradant, i.e., the blank, the low density polyethylene retained 75 percent of its extension. This clearly illustrates the effectiveness of the additives.

EXAMPLES 18 – 26 and 27 – 29

Table 3 gives the results of accelerated ageing tests on polypropylene plaques stabilised with:
  0.1 percent weight of 2,6-di-t.butyl-4-methyl phenol
  0.25 percent weight of dilauryl thiodipropionate
  0.4 percent weight of calcium stearate
The plaques also contained 0.1 percent by weight of the prodegradants specified in Table 3. Table 4 gives similar results for unstabilised low density polyethylene.

The samples were placed in contact with an Atlas UV lamp ($\lambda max = 355$ nm) and wrapped in aluminium foil. The samples were inspected periodically for flex-crack failure and their endurances are reported in Table 3 (in hours) for the polypropylene samples and in Table 4 (in days) for the low density polyethylene.

TABLE 3

| Example | Prodegradant | Sample (hours) | Blank (hours) |
|---|---|---|---|
| 18 | $C_6H_5COC_6H_4C_{12}H_{25}$ | 16 | 41 |
| 19 | $C_6H_5COCOC_6H_5$ | 24 | 73 |
| 20 | $CH_3COC_6H_4C_2H_5$ | 16.5 | 41 |
| 21 | $CH_3COC_6H_4C_{12}H_{25}$ | 16.5 | 41 |
| 22 | $C_6H_5COC_6H_4SO_2C_6H_5$ | 24 | 73 |
| 23 | $C_6H_5COC_6H_4COC_6H_5$ | <24 | 28 |
| 24 | 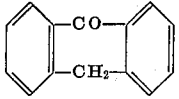 | 24 | 73 |
| 25 | 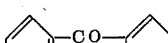 | 24 | 73 |
| 26 | 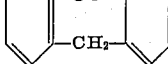 | 24 | 73 |

NOTE: All $C_6H_4$-groups are linked para.

TABLE 4

| Example | Prodegradant | Sample (days) | Blank (days) |
|---|---|---|---|
| 27 | $C_6H_5.CO.C_6H_4.C_{12}H_{25}$ | 21 | 39 |
| 28 | $CH_3.CO.C_6H_4.C_{12}H_{25}$ | 28 | 39 |
| 29 | $C_6H_5.CO.C_6H_4.CO.C_6H_5$ | 21 | 39 |

Note: All $C_6H_4$-groups are linked para.

EXAMPLES 30 and 31

Table 5 gives results on samples of unstabilised low density (LDPE) and high density polyethylene (HDPE) containing 0.1 percent of the prodegradant specified. Pressed sheet samples 1 cm by 3 cm were irradiated in Tests 1 and 2 described below. In both tests the samples were examined daily for flex-crack failure and the time to embrittlement is taken as a measure of the performance of the additive, shorter times indicating better performance.

In Test 1 the samples were subjected to UV irradiation using a 500 watt Hanovia 509/10 medium pressure UV arclight the output of which was filtered through 0.5 mm Pyrex (RTM) to remove radiation below 290 nm. The samples were rotated around the lamp at a distance of 10 cm 14 times per minute.

In Test 2 the samples were subjected to UV irradiation using a combination of a fluorescent sunlamp and a black lamp. The samples were maintained at a distance of 10 cm from the lamps.

TABLE 5

| Example No. | Prodegradant | LDPE Test 1 Days | LDPE Test 2 Days | HDPE Test 1 Days |
|---|---|---|---|---|
|  | Blank | 12 | 42 | 14 |
| 30 | p-lauryl acetophenone | 12 | 23 | 8 |
| 31 | triethyl chlorobenzophenone | 6 | 18 | 12 |

We claim:

1. A poly-alpha-olefin composition selected from the group consisting of homopolymers and copolymers of alpha-mono-olefins having up to 6 carbon atoms which has incorporated therein as prodegradant 0.001 percent up to 10 percent by weight of a ketone selected from the group consisting of p-lauryl acetophenone or p-lauryl benzophenone, [of the general formula $$R^3-CO-R^4$$

where $R^3$ is a phenyl group with one of more substituents selected from the group consisting of alkyl and halogen, and where $R^4$ is a alkyl group, a phenyl group or a phenyl group with one or more substituents selected from the group consisting of alkyl and halogen,] said poly-alpha-olefin composition being capable of degradation by ultraviolet light faster than a poly-alpha-olefin composition without said prodegradant.

2. A composition according to claim 1, in which the prodegradant is an alkyl p-alkylphenylketone.

3. A composition according to claim 1, in which the prodegradant is a p-lauryl acetophenone.

4. A composition according to claim 1, in which the prodegradant is a phenyl p-alkylphenylketone.

5. A composition according to claim 1, in which the prodegradant is a p-lauryl benzophenone.

6. A composition according to claim 1 in which the poly-alpha-olefin is polyethylene.

* * * * *